Oct. 19, 1971  L. P. TINKHAM  3,613,440
BRAKE PEDAL PRESSURE SIGNAL SENDING UNIT
Filed March 27, 1969  2 Sheets-Sheet 1
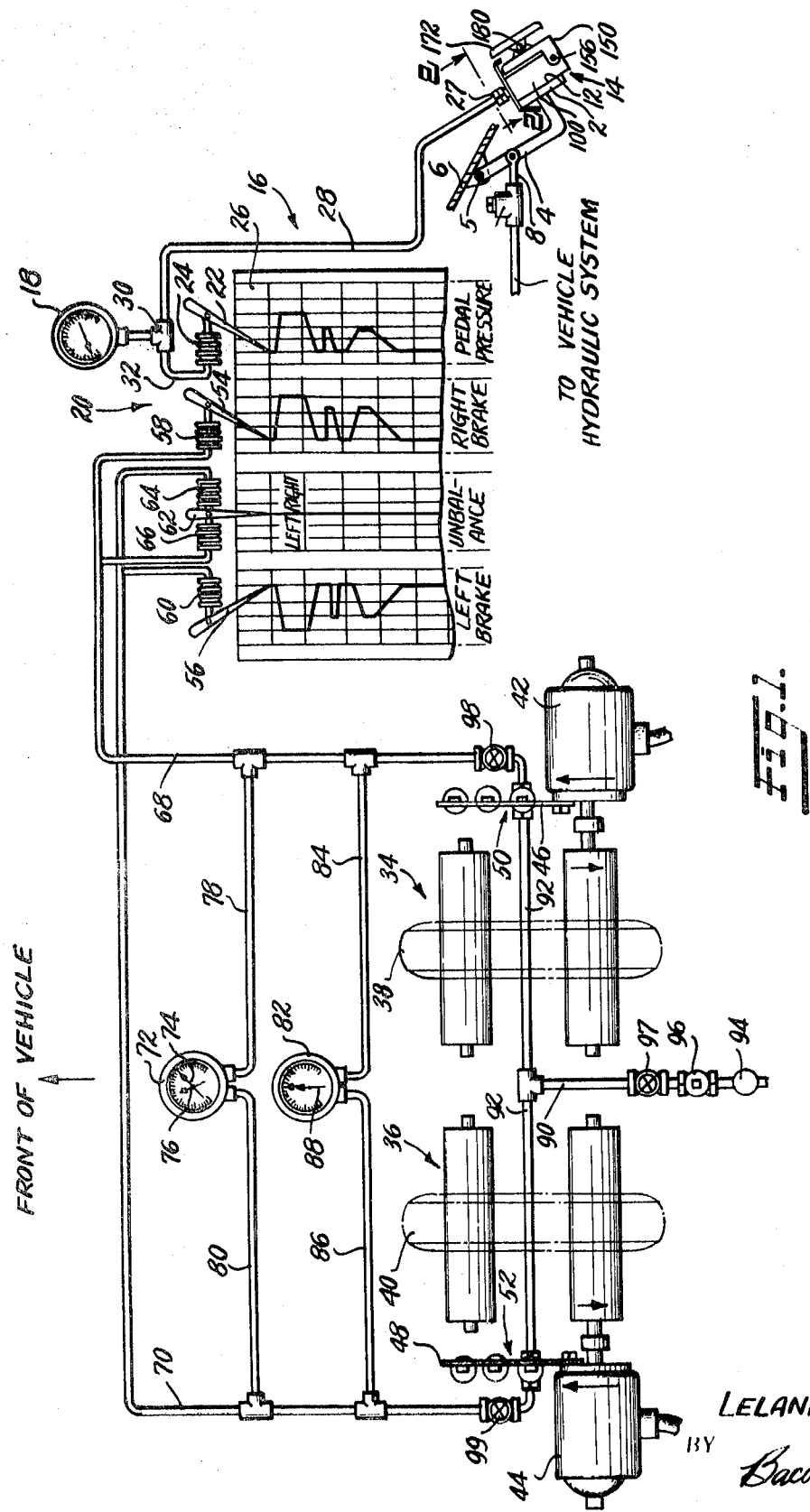
INVENTOR.
LELAND P. TINKHAM
BY Bacon & Thomas
ATTORNEYS Oct. 19, 1971 L. P. TINKHAM 3,613,440
BRAKE PEDAL PRESSURE SIGNAL SENDING UNIT
Filed March 27, 1969 2 Sheets-Sheet 2
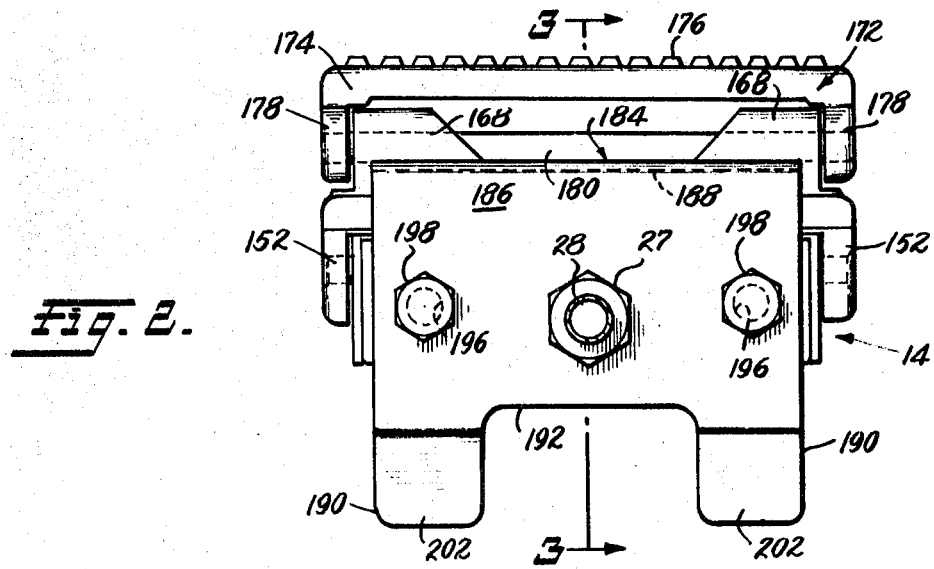
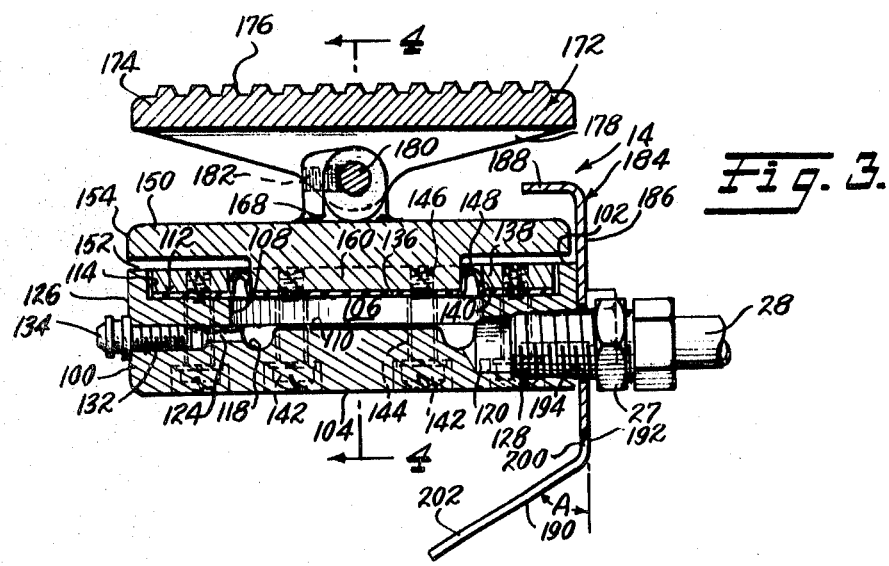
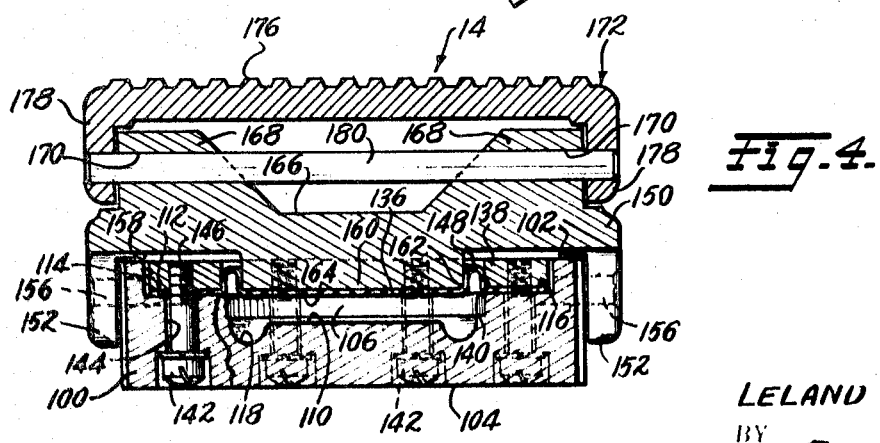
INVENTOR.
LELAND P. TINKHAM
BY
Bacon & Thomas
ATTORNEYS

United States Patent Office 3,613,440
Patented Oct. 19, 1971

3,613,440
BRAKE PEDAL PRESSURE SIGNAL SENDING UNIT
Leland P. Tinkham, Temple City, Calif., assignor to Clayton Manufacturing Company, El Monte, Calif.
Filed Mar. 27, 1969, Ser. No. 811,167
Int. Cl. G01l 5/28
U.S. Cl. 73—132
14 Claims

ABSTRACT OF THE DISCLOSURE

A hydraulic pressure signal sending unit for use with an assembly for measuring the force applied to an automobile brake pedal by the foot of an operator, the sending unit being detachably mountable upon a conventional brake pedal and being connected with a remote fluid pressure gauge. The sending unit is operated manually and is designed to translate foot pressure into hydraulic pressure, which is transmitted through a flexible hose to the pressure gauge. The sending unit includes a rolling diaphragm mounted in a housing, and to which diaphragm foot pressure is applied through a pivoted pressure plate mounted on said housing and a treadle pivotally mounted on said pressure plate. The pivotal axis of the pressure plate is adjacent one end thereof and parallel with the pivotal axis of the treadle, which is about midway of the length of the pressure plate. This arrangement, coupled with the rolling diaphragm makes the sending unit insensitive to the angle at which foot pressure is applied.

BACKGROUND OF THE INVENTION

(1) Field of the invention

This invention relates generally to apparatus for measuring the force applied to an automobile brake pedal by an operator's foot, and more particularly to a unique brake pedal pressure sending unit designed to generate a fluid pressure signal in response to foot pressure, and direction of application of foot pressure thereto.

(2) Description of the prior art

During recent years the design of automotive vehicles has become increasingly sophisticated, with new developments in engines, power trains, and other automotive components. Concomitantly, traffic loading of the highway networks has greatly increased. These factors, coupled with higher speeds and increasing vehicle acceleration capabilities, has made it necessary to develop sensitive and reliable braking systems.

Because the demands placed on automobile braking systems today are far greater than that of the past, it is necessary that these systems be carefully adjusted and maintained for safe operation. Measuring the effectiveness of the brakes alone does not provide adequate data for diagnosing brake deficiencies. Accordingly, there is a need for measuring and testing equipment to precisely and simultaneously reveal the several operational characteristics of a brake system. One such need is apparatus that can precisely measure the foot pressure applied to an automobile brake pedal while the effectiveness of the brakes is being measured by other apparatus.

The present invention is directed to a brake pedal pressure signal sending unit for use in an assembly to precisely measure the foot pressure applied to a brake pedal, which unit is very light in weight, substantially friction-free, is insensitive to the position of the foot of the vehicle operator, and can easily be mounted on any brake pedal without the use of tools.

SUMMARY OF THE INVENTION

The pressure signal sending unit of the invention is designed for use with any braking device or system where it is desirable to know the pressure applied by the operator, and is detachably mountable directly on the face of a brake pedal and connected by a hose or other connector to a calibrated pressure gauge and/or other pressure indicating means, such as the transducer of a graph recorder device. The unit is filled with hydraulic fluid, and when foot pressure is applied to the brake pedal the sending unit generates a fluid pressure signal proportionate to the applied foot pressure to be recorded, along with other brake test data, on the graph recorder device.

The sending unit is designed to be easily mounted on any conventional brake pedal, and includes a housing having a fluid chamber therein over which a rolling diaphragm is mounted. A pressure plate is pivoted on the housing and includes a portion on the under surface thereof that is engaged with the outer surface of the diaphragm. Pivotally mounted on the pressure plate, by a trunion arrangement, is a treadle or auxiliary foot pedal, positioned to present the upper surface thereof to the operator's foot. The pivoted axis of the treadle plate is spaced forwardly of the pivotal axis on the pressure plate.

The design of the pressure signal sending unit is such that the unit is insensitive to the direction at which operator foot pressure is applied thereto, which insures reliability under all normal operating conditions. Further, the mounting arrangement for the diaphragm, the pressure plate and the treadle plate insure that a hydraulic pressure truly proportionate to the applied foot pressure will be transmitted to the graph recorder and to the pressure gauge.

It is the principal object of the present invention to provide a brake pedal pressure signal sending unit that is easily attachable to any automobile brake pedal, and which will generate and send a signal that is accurately proportionated to foot pressure applied to the brake pedal, regardless of the position of the vehicle operator's foot thereon or the direction from which the foot pressure is applied.

Another object is to provide an economically constructed pressure signal sending unit for accurately transforming foot pressure on a brake pedal into fluid pressure, and which can be connected with one or more pressure measuring or indicating devices.

A further object is to provide a brake pedal force measuring assembly that can be easily filled with hydraulic fluid and bled of entrapped air.

A still further object is to provide a hydraulic pressure signal sending unit that is light in weight and substantially frictionless in operation so that highly accurate results can be obtained in use.

Other objects and many of the attendant advantages of the invention will be readily apparent from the following description of the preferred embodiment, when taken in conjunction with the accompanying drawings.

DESCRIPTION OF THE DRAWINGS

FIG. 1 is a diagrammatic view showing the present pressure signal sending unit assembled in a brake pedal force measuring assembly, which assembly is shown in association with brake analyzing apparatus for measuring applied brake force and brake balance, or unbalance, between a pair of vehicle wheels;

FIG. 2 is an enlarged view looking in the direction of the arrows 2—2 in FIG. 1, showing the signal sending unit in end elevation;

FIG. 3 is a vertical sectional view taken on the line 3—3 of FIG. 2, showing in particular the configuration of the attachment bracket, the internal construction of the sending unit, and the pivotal mounting arrangement for the treadle; and FIG. 4 is a vertical sectional view taken on the line 4—4 of FIG. 3, and showing the pivotal mounting for the pressure plate and further details of the pivotal mounting for the treadle.

DESCRIPTION OF THE PREFERRED EMBODIMENT

Referring now to FIG. 1 of the drawings, a brake pedal 2 is shown mounted on an arm 4 pivoted at 5 to the firewall 6 of an automobile, the arm 4 being connected by a pivoted link 8 to the master cylinder 10 of the vehicle's hydraulic brake system. Detachably mounted on the upper surface 12 of the brake pedal 2 is the pressure signal sending unit 14 of the present invention.

The signal sending unit 14 is shown in FIG. 1 as part of a brake pedal pressure measuring assembly 16, which assembly includes a Bourdon or other type fluid pressure measuring gauge 18 calibrated to directly show the value in pounds of foot pressure applied by an operator, and a recorder device 20 including a stylus arm 22 operated by a pressure transducer 24 adapted to record brake pedal pressure on a moving chart 26. The pressure signal sending unit 14 is connected by a fitting 27 to one end of a pressure hose or other conduit 28, the other end of which hose is connected to one leg of a T-fitting 30, the gauge 18 being connected to the center leg of said fitting. The remaining leg of the fitting 30 is connected by a conduit 32 to the transducer 24.

The brake pedal pressure measuring assembly 16 of FIG. 1 is shown as part of a complete brake testing and analyzer assembly, which is itself the subject of a co-pending patent application entitled, "Recorder and Computer Type Brake Analyzer and Method," filed in the name of Edwin L. Cline. Because the complete brake analyzer assembly is the subject of said other patent application, such will only be briefly described herein.

Referring to FIG. 1, in addition to the assembly 16 already described, the brake analyzing apparatus includes right and left pairs of rolls 34 and 36 rotatably mounted on a frame assembly (not shown), on which are received the right and left wheels 38 and 40 of a vehicle to be tested. Cradle-mounted electric motors 42 and 44 are connected to the rear roll of each pair of rolls 34 and 36, respectively, and are capable of driving the wheels 38 and 40 at equal controlled speeds up to 45 m.p.h. or more. Torque arms 46 and 48 are bolted to the housing of the motors 42 and 44 are arranged to operate right and left pneumatic weighing units 50 and 52, respectively.

In performing a brake test on the wheels 38 and 40, the operator applies various predetermined foot pressures to the brake pedal 2 of the test vehicle in a predetermined timed sequence, the value of such foot pressure being indicated on the gauge 18 and being recorded on the chart 26 by the recorder 20. When the vehicle brakes are actuated, the braking effort produced at each wheel 38 and 40 is proportional to the reaction force upon the corresponding housing of motors 42 and 44, and is measured by the pneumatic weighing units 50 and 52, the weighing units 50 and 52 being connected to the recorder 20.

The recorder 20 is of the plural channel strip chart type, and has an adjustable time base whereby it can continuously record on the chart 26 the analog test signals of a complete brake testing sequence, for later inspection and analysis. The analyst may then read the values of the test output signals from the calibrated strip chart 26 for comparison with standard values, or may overlay a transparent or preformed mask on the chart to expose only those test values which deviate from an acceptable standard.

The first channel of the recorder 20 includes the stylus arm 22, and records brake pedal pressure. Two other channels of the recorder 20 record the braking effort of the right and left wheels 38 and 40, and include stylus arms 54 and 56 operated by pressure transducers 58 and 60, respectively. The remaining channel of the recorder 20 records the balance or unbalance between the braking efforts of the right and left wheels 38 and 40, and includes a stylus arm 62 operated by a pair of pressure transducers 64 and 66.

The output pressure of the right pneumatic weighing unit 50 is communicated by a conduit 68 to the transducers 58 and 66, and the left weighing unit 52 is similarly connected by a conduit 70 to the transducers 60 and 64. A dual pressure gauge 72 having a pair of coaxially mounted pointers 74 and 76 is connected to the conduits 68 and 70 by tubes 78 and 80, respectively, in order to visually display the braking force of the right and left wheels 38 and 40, it being understood that the pointer 74 indicates the braking effort of the right wheel 38, while the pointer 76 indicates the braking effort of the left wheel 40.

A differential pressure gauge 82 is also connected between the conduits 68 and 70, to visually display the total balance or unbalance in the left and right wheel braking efforts. Thus, the gauge 82 is connected to the conduits 68 and 70 by tubing 84 and 86, respectively, and includes a pointer 88 that will remain on zero when the braking efforts of the wheels 38 and 40 are in balance. A greater braking effort by either the right or the left wheel 38 or 40 will cause deflection of the pointer 88 to the right or left, as appropriate, the extent of such deflection indicating the degree of imbalance.

Air under pressure for operating the gauges 72 and 82 is supplied through a conduit 90, which is connected by a conduit 92 with the air weighing units 50 and 52. The conduit 90 has an air filter and water trap 94, a pressure regulator valve 96 and a shut-off valve 97 connected therein. A valve 98 connected in the conduit 68 and a valve 99 connected in the conduit 70 are adjustable to eliminate surges and thereby prevent overshoot and under-shoot of the gauges 72 and 82.

The signal sending unit 14 includes a rectangular housing 100, preferably of aluminum, having flat, parallel top and bottom faces 102 and 104, respectively. Centrally thereof, the top face 102 has an open circular counterbored chamber 106 defined by a lower cylindrical side wall 108 and a flat bottom wall 110, the upper end of the chamber 106 having an annular counterbore 112 formed thereabout that is defined by an upper cylindrical sidewall 114 and a flat, annular bottom wall 116. The bottom wall 110 of the recess 106 has an annular rounded groove 118 therein positioned near the juncture of said bottom wall with the lower recess sidewall 108. The groove 118 communicates with a pressure port 120 drilled into the rear face 122 of the housing 100 and with a bleed port 124 drilled into the front face 126 of said housing.

The outer end of the pressure port 120 has threads 128 therewithin, to receive the threaded fitting 27 for connecting the conduit 28 to the chamber 106. The outer end 132 of the bleed port 124 is enlarged and threaded to receive a threaded bleed plug 134.

Seated on the bottom wall 116 of the counterbore 112 is the outer marginal portion of a rolling-type diaphragm 136, which is clamped to the housing 100 by an annular retainer ring 138. The retainer ring 138 has an outer diameter slightly less than that of the counterbore 112. The lower inside edge 140 of the ring 138 is secured in position by a plurality of circumferentially spaced bolt 142 received in countersunk vertical bores 144 in the housing 100, the upper ends of which bolts are received in threaded bores 146 in said retainer ring. The diaphragm 136 has an upwardly directed annular roll fold 148 thereon positioned just inside the retainer ring 138. The retainer ring 138 is of a thickness such that when installed, the top surface thereof lies about flush with the housing top face 102.

Foot pressure is applied to the upper and exposed surface of the diaphragm 136 through a rectangular pressure plate 150, preferably made of aluminum, having downwardly extending lugs 152 on the sides thereof at the forward edge 154 of the plate. The pressure plate 150 is pivotally connected to the housing 100 by aligned pivot pins 156 extending through the lugs 152, and is mounted so that a clearance space exists between the undersurface 158 of said pressure plate and the top face 102 of the housing. The pressure plate 150 has an undersurface 158 with a circular protrusion 160 thereon of a diameter to be snugly received within the diaphragm roll-fold 148 and also within the chamber 106. The bottom edge 162 of the protrusion 160 is rounded and the end face 164 thereof is flat. The protrusion 160 has a height slightly greater than the height of the counterbore sidewall 114.

The top surface 166 of the pressure plate 150 has a pair of lugs 168 at its sides and centrally of its length. The lugs 168 have aligned bores 170 extending therethrough which lie prallel to the axis on which the pivot pins 156 lie. Mounted on the pressure plate 150 is a treadle or auxiliary pedal 172, preferably made of aluminum, comprising a rectangular body 174 having a tread formation 176 on the upper surface thereof, and a pair of triangular flanges 178 extending downwardly from the side edges thereof. The triangular flanges 78 are rounded at their apex, the rounded portions having a bore therethrough aligned with the bores 170. A pivot shaft 180 pivotally mounts the treadle on the pressure plate 150. The shaft is secured in place by a set screw 182 carried by a boss on one of the lugs 168.

It is readily seen that when foot pressure is applied to the treadle 172 the pressure plate 150 will be pivoted downwardly about its pivot pins 156, whereby the pressure plate protrusion 160 presses against the rolling diaphragm 132 to move it into the chamber 106. This action in turn results in reduction of the effective volume of the chamber 106, which if the chamber is initially filled with hydraulic fluid will force a corresponding volume of such fluid through the port 120 and the conduit 28 to the gauge 18 and the pressure transducer 24.

The pivotal shaft connection 180 between the treadle 172 and the pressure plate 150 allows the treadle plate to readily adjust to and accommodate the position of the foot of an operator placed thereon, regardless of the direction from which the leg of the operator exerts pressure. Further, the same pivoted shaft connection 180 allows the treadle 172 to adjust and remain in a relatively stable position as regards the operator's foot during downward pivotal movement of the pressure plate 150. The result of the pivotal mounting arrangements for the treadle 172 and the pressure plate 150 is therefore that the foot pressure of an operator will be faithfully and accurately transformed into a fluid pressure signal.

The housing 100, the pressure plate 150 and the treadle 172 are made of light weight material so that the unit 14 does not by its own weight apply any measurable braking force, and no return spring is required to retract the pressure plate 150. The use of the rolling diaphragm 136, instead of a piston, renders the unit 14 substantially friction-free. Hence, accurate foot pressure measurements are assured.

For proper operation, the chamber 106, the conduit 28, and all other components of the system should be completely filled with a suitable hydraulic fluid, and all air bubbles should be bled from the system. The plug 134 can be removed to fill and bleed the system, and the gauge 18 and the pressure transducer 24 are also preferably provided with suitable air bleed ports.

The pressure signal sending unit 14 is designed to be easily mounted on the face of any automotive brake pedal, and for this purpose a stainless steel bracket 184 is attached to the rear face 122 of the housing 100. The bracket 184 is made from one piece of sheet metal, and includes a flat main body portion 186 having a short, inwardly-extending perpendicular flange 188 at its upper edge, and a pair of spaced, inwardly inclined holding flanges 190 formed at the opposite side of the lower edge 192 thereof. The main body 186 has a centrally positioned opening 194 therein for receiving the fitting 27, and two spaced bores 196 therethrough for receiving bolts 198 that are threaded into the housing 100 to secure the bracket 184 thereto. The bores 196 and the opening 194 are arranged to lie on a common horizontal axis.

The bracket 184 is attached to the housing 100 so that the bottom edge 192 thereof is spaced from the bottom face 104 of the housing 100 a distance about equal to the average thickness of an automobile brake pedal. The spaced holding flanges 190 are designed to be passed on both sides of the arm 4 supporting the brake pedal 2, and each includes a short portion 200 that lies in the plane of the bracket body portion 186, and a longer inclined portion 202 that extends inwardly at an angle A of about 30° from said plane. The inclined portions 202 serve to detachably hold the sending unit 14 in place on the brake pedal 2, as shown in FIG. 1.

Obviously, many modifications and variations are possible, without departing from the invention as shown and described.

I claim:

1. A brake pedal pressure signal sending unit for use in testing the brakes of a motor vehicle, comprising: a housing mountable upon a brake pedal and having an upwardly facing recess therein; a diaphragm extending across the upper end of said recess, the under surface of said diaphragm cooperating with said recess to define a fluid chamber, said housing having a port communicating with said chamber adapted to be connected with means for receiving a pressure signal from said chamber; and a relatively flat pressure plate overlying said diaphragm and pivotally mounted adjacent one end thereof upon said housing for movement toward and away from said housing and including a portion on its lower side engageable with the upper surface of said diaphragm, said pressure plate being operable by operator foot pedal pressure in applying the vehicle brakes to produce a pressure signal.

2. A unit as recited in claim 1, including a bracket attached to the housing for mounting the unit on a brake pedal.

3. A unit as recited in claim 2, wherein the housing includes an end face and the bracket is attached to the end face and includes a pair of spaced, inwardly and downwardly inclined holding flanges disposed below the housing, said flanges being receivable over the edge of said brake pedal to detachably mount the unit thereon.

4. A unit as defined in claim 1, in which the pressure plate is pivotally attached at one end thereof to the housing.

5. A unit as recited in claim 4, including a foot treadle overlying and pivotally mounted upon the pressure plate.

6. A unit as recited in claim 5, in which the foot treadle is pivotally mounted medially thereof upon the pressure plate at a point about midway of the length of the pressure plate.

7. A unit as recited in claim 6, in which the pivotal axes of the pressure plate and foot treadle are parallel, and the axis of the foot treadle is disposed to one side of the axis of the pressure plate.

8. A unit as recited in claim 1, wherein the housing has a counterbore with an annular flat bottom wall above the upwardly facing recess, and wherein the marginal edge portion of the diaphragm extends into the counterbore, and wherein a ring and fastening elements clamp the marginal edge of the diaphragm against the annular bottom wall of the counterbore.

9. A unit as recited in claim 1, in which the diaphragm is of the rolling type and has an annular upwardly extending fold formed therein, and wherein the pressure plate portion engaging the diaphragm is in the form of a circular projection and is received within said annular roll fold.

10. A unit as recited in claim 1, including a flexible conduit connected with the port communicating with the fluid chamber in the housing, and a pressure gauge connected to said conduit for indicating the value of the pressure signal transmitted from the chamber to the pressure gauge.

11. A unit as recited in claim 1, including a flexible conduit connected with the port of the housing, a pressure operated transducer connected with said conduit, and a recording stylus actuated by said transducer in response to a pressure signal transmitted through said conduit.

12. A unit as recited in claim 1, including a flexible conduit connected with the port of the housing, a pressure gauge connected with said conduit, and a pressure actuated transducer, having a recording stylus, also connected with said conduit, whereby the pressure gauge and the transducer are simultaneously actuated by a pressure signal transmitted through said conduit.

13. A brake pedal pressure signal sending unit for use in testing the brakes of a motor vehicle, comprising: a housing having an upwardly facing recess therein and a counterbore above said recess, said recess being defined by a vertical side wall and a circular horizontal bottom wall, and said counterbore being defined by a vertical side wall and an annular horizontal bottom wall; a diaphragm extending across the upper end of said recess and forming therewith a closed chamber, said diaphragm having a marginal edge portion extending into said counterbore and overlying said annular bottom wall of said counterbore; a ring and fastening elements clamping said marginal edge portion of said diaphragm against said annular bottom wall of said counterbore, said housing having a port communicating with said closed chamber through which a pressure signal is transmitted; a pressure plate overlying said diaphragm; means pivotally connecting one end of said pressure plate to said housing for pivotal movement relative to said housing, said pressure plate including a cylindrical boss on its lower side engaged with the adjacent surface of said diaphragm, said diaphragm having an annular upwardly extending fold formed therein inwardly of said ring and surrounding said cylindrical boss, said cylindrical boss being of a diameter smaller than the diameter of said recess so as to be movable into said recess; a foot treadle overlying said pressure plate; and means pivotally mounting said foot treadle upon said pressure plate for movement about an axis transversely spaced from but parallel with the pivotal axis of said pressure plate.

14. A unit as recited in claim 13, including a flexible conduit connected with the port communicating with the chamber in the housing; a pressure gauge connected to said conduit for indicating the value of the pressure signal transmitted from said chamber to said pressure gauge; and a pressure actuated transducer, having a recording stylus, also connected with said conduit, whereby said pressure gauge and said transducer are simultaneously actuated by a pressure signal transmitted through said conduit and said recording stylus is actuated in accordance with the value of the pressure signal being transmitted.

References Cited
FOREIGN PATENTS

| 833,693 | 4/1960 | Great Britain | 73—141 |
|---|---|---|---|
| 1,018,165 | 10/1952 | France | 73—141 |

JERRY W. MYRACLE, Primary Examiner

U.S. Cl. X.R.

73—141 R